United States Patent [19]

Braden, Jr. et al.

[11] 4,059,154
[45] Nov. 22, 1977

[54] MICELLAR DISPERSIONS WITH TOLERANCE FOR EXTREME WATER HARDNESS FOR USE IN PETROLEUM RECOVERY

[75] Inventors: William B. Braden, Jr.; Kenoth H. Flourny, both of Houston, Tex.

[73] Assignee: Texaco Inc., New York, N.Y.

[21] Appl. No.: 657,808

[22] Filed: May 24, 1976

Related U.S. Application Data

[62] Division of Ser. No. 421,296, Dec. 3, 1973.

[51] Int. Cl.² .............................................. E21B 43/22
[52] U.S. Cl. ..................................... 166/274; 166/273; 252/8.55 D
[58] Field of Search ............................ 166/273-275, 166/252; 252/8.55 D

[56] References Cited

U.S. PATENT DOCUMENTS

| | | | |
|---|---|---|---|
| 3,245,467 | 4/1966 | Fitch | 166/273 |
| 3,406,754 | 10/1968 | Gogarty | 166/273 |
| 3,508,611 | 4/1970 | Davis, Jr. et al. | 166/252 |
| 3,688,844 | 9/1972 | Roszelle | 166/274 |
| 3,811,505 | 5/1974 | Flournoy et al. | 166/274 |
| 3,827,496 | 8/1974 | Schroeder | 166/273 |
| 3,827,497 | 8/1974 | Dycus et al. | 166/274 |
| 3,830,301 | 8/1974 | Holm | 166/274 |
| 3,920,073 | 11/1975 | Holm | 166/274 |

Primary Examiner—Stephen J. Novosad
Attorney, Agent, or Firm—Carl G. Ries; Thomas H. Whaley; Kenneth R. Priem

[57] ABSTRACT

A novel, thickened, miscible flooding medium to displace petroleum in subterranean reservoirs is a dispersion of light hydrocarbons, water and a surfactant system. The water may have from about 1500 to 12,000 parts per million polyvalent ions such as calcium and/or magnesium. The surfactant system comprises a water soluble salt of an alkyl or an alkylaryl sulfonate plus a water soluble salt of an alkyl or alkylaryl polyethoxy sulfate anionic surfactant plus a nonionic surfactant such as a polyethoxylated alkyl phenol, a polyethoxylated aliphatic alcohol or a fatty acid mono or dialkanolamide.

8 Claims, 4 Drawing Figures

STOCK TANK OIL DISPLACEMENT WATERFLOOD FOLLOWED BY EMULSION FLOOD IN QUARTER-5 SPOT MODEL

STOCK TANK OIL DISPLACEMENT
WATERFLOOD FOLLOWED BY EMULSION
FLOOD IN QUARTER-5 SPOT MODEL

FLOOD 3

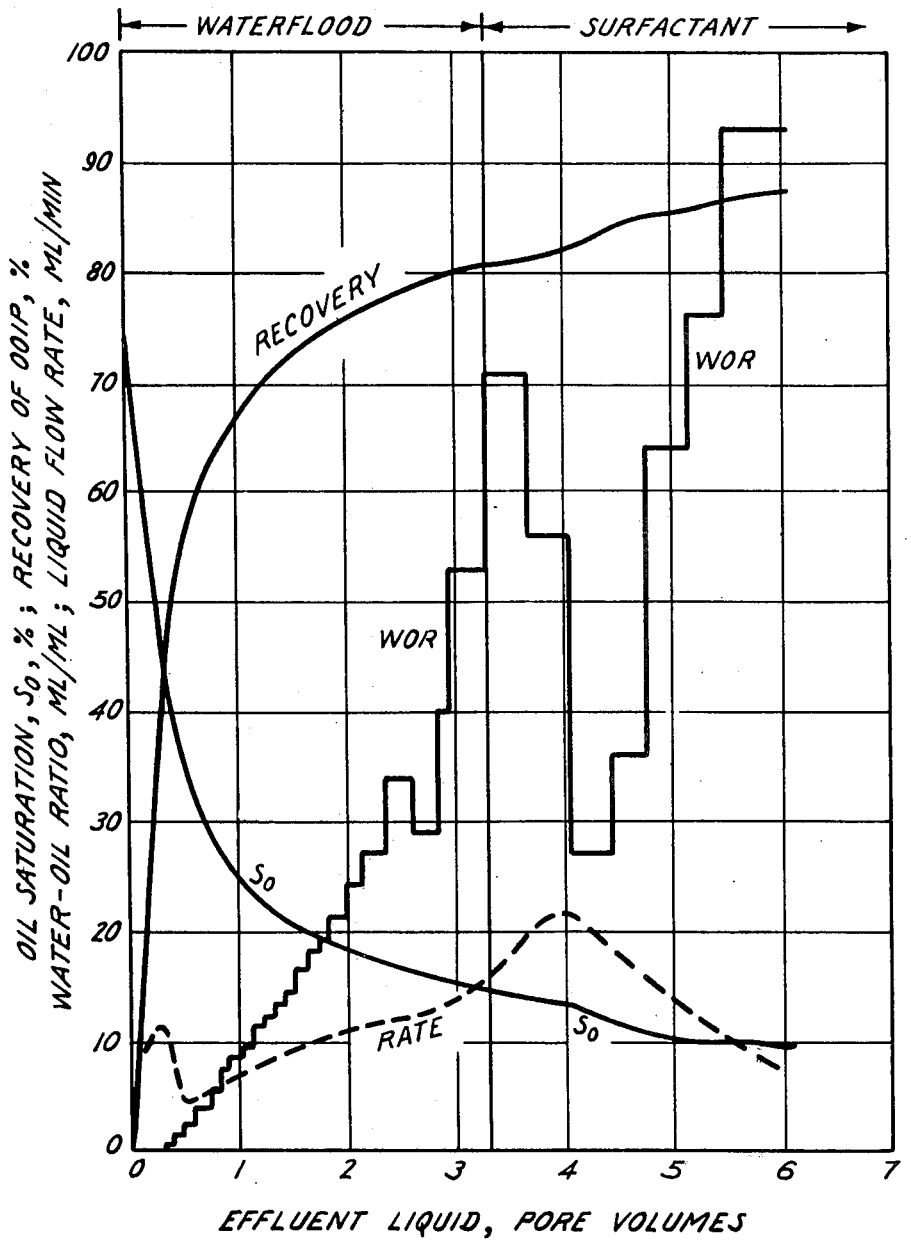

MICELLAR DISPERSIONS WITH TOLERANCE FOR EXTREME WATER HARDNESS FOR USE IN PETROLEUM RECOVERY

This is a division, of application Ser. No. 421,296, filed Dec. 3, 1973.

BACKGROUND OF THE INVENTION

1. Field of the Invention

This invention pertains to the field of secondary and/or tertiary recovery of petroleum from a subterranean hydrocarbon reservoir utilizing as a recovery medium emulsified mixtures of hydrocarbons, aqueous fluids and surfactants. These recovery mediums are generally known as micellar dispersions.

2. Description of the Prior Art

The prior art teaches that solubilized oil-water systems can be employed as a type of solvent slug in miscible flooding operations to recover oil from subterranean hydrocarbon formations. In a typical operation of this kind the leading edge of the slug is miscible with the oil bank ahead of it, and the water or aqueous components used in the driving slug is miscible, or at least partially soluble, in the trailing edge of the solvent slug. this in effect forms a single phase flooding operation.

A problem that has plagued the use of emulsified and/or micellar dispersions in petroleum recovery operations has been their limited use in conjunction with, or in formations containing hard water. Hard water results from the presence of large amounts of polyvalent cations such as calcium or magnesium. This disadvantage, or course, not only limits the kind of aqueous fluid which may be used to form the micellar dispersion but also limits the types of reservoirs in which the micellar dispersions may be used. For example, U.S. Pat. No. 3,506,070 to Jones describes a micellar dispersion but specifically states that soft water is preferred and limits the amount of dissolved salts to small amounts. In an example in the Jones patent a micellar dispersion is formed with water containing only 412 parts per million of total dissolved solids. This amount of dissolved solids is of course quite small and difficult to obtain in oil fields. Thus, the type of dispersion described in Jones would not be useful in a formation containing large amounts of dissolved polyvalent cations such as a calcium carbonate reservoir. U.S. Pat. No. 3,698, 479 to Askew also describes a micellar dispersion. However, Askew specifically states that the presence of excessive amounts of divalent metal ions in the system in which the micellar dispersion is formed is undesirable. U.s. Pat. No. 3,688,844 to Roszelle attempts to solve the problem of limited use of micellar dispersions in hard waters by adding a metal phosphate to the micellar dispersion. Applicants have discovered certain surfactant systems whereby micellar dispersions may be formed which have a very high degree of tolerance for very hard water without the addition of special additives.

SUMMARY OF THE INVENTION

The invention is a novel, thickened, miscible flooding medium useful for displacing petroleum in subterranean reservoirs. The medium consists of a dispersion of light hydrocarbons, an aqueous fluid and a surfactant system. This aqueous fluid may have from about 1500 to about 12,000 parts per million polyvalent ions present, such as calcium and/or magnesium. The surfactant system is comprised of an aqueous solution an anionic surfactant such as a water soluble salt of an alkyl or an alkylaryl sulfonate, for example sodium dodecylbenzene sulfonate plus a water soluble salt of an alkyl or alkylaryl polyethoxylated sulfate anionic surfactant such as sodium dodecyl polyethoxy sulfate, plus a nonionic surfactant such as a fatty acid diethanolamide, a polyethoxylated aliphetic alcohol, or a polyethoxylated alkyl phenol. The invention is also a method for recovering petroleum from subterranean reservoirs using the novel, thickened fluid described above.

BRIEF DESCRIPTION OF THE DRAWINGS

FIGS. 3 and 4 are comparisons of the effectiveness of a simple surfactant flood and an emulsion flood.

DESCRIPTION OF THE PREFERRED EMBODIMENTS

Figure 1:
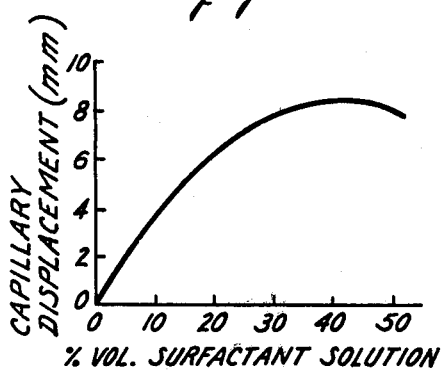
FIG. 1 illustrates capillary displacement tests using varying concentrations of surfactant compositions.

Examples of hydrocarbons which may be used in the novel thickened fluid of our invention include crude oil (both sweet and sour) and partially refined fractions of crude oil. For example, size cuts from crude column overheads, gas oils, kerosene, heavy napthas, straight run gasoline and liquefied petroleum gases. In general, pure hydrocarbons are satisfactory from an operational viewpoint but may not be desirable for economic reasons. Based purely on economics the preferred hydrocarbon is normally one locally available which may be crude oil. However, from an operational standpoint it is preferred to use a hydrocarbon or hydrocarbons containing 1 to 6 carbon atoms. These light hydrocarbons, in addition to being excellent solvents for most petroleum in hydrocarbon reservoirs, have the additional advantage of being readily recoverable from the thickened fluid after the oil recovery has proceeded to the point that the thickened fluid itself is being produced. Thus, the light hydrocarbons, either pure or mixtures thereof may be recovered and reused.

An aqueous fluid is needed in the thickened fluid or our invention to mix with the hydrocarbon and the surfactants to form the micellar dispersion. This aqueous fluid, of course, may be soft but if hard the aqueous fluid should ideally contain from about 1500 to 12,000 parts per million polyvalent ions, such as calcium and/or magnesium. The aqueous fluid may also contain other salts arranging from about 1,000 parts per million upward to about 250,000 parts per million. The presence of monovalent cations such as sodium in sodium chloride may be quite large. It is the presence of large amounts of polyvalent cations that has usually limited the use of micellar dispersions before our invention. Where hard aqueous fluids are to be used, the surfactant systems of the invention to be described below work optimally in an aqueous solution containing from about 1500 to about 12,000 parts per million polyvalent cations.

The surfactant systems which operate most effectively in the micellar dispersions of our invention may be used to best advantage in a critical concentration range and in this range will effectively reduce the interfacial tension between oil and water thus functioning effectively in the presence of calcium and magnesium ions in concentrations of from about 1500 to about 12,000 parts per million. The dual surfactant system useful in our invention may be broadly described as three types of surfactants as follows:

1. A first anionic surfactant having one of the following general formulas:

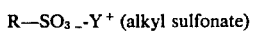   (a)

wherein R is an alkyl radical, linear or branched, having from 5 to 25 and preferably from 8 to 14 carbon atoms, and Y is a monovalent cation such as sodium, potassium or ammonium, or

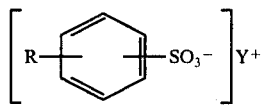   (b)

(alkylaryl sulfonate)

wherein R and Y have the same meaning as above. For example, if R is linear dodecyl and Y is ammonium, the material is ammonium linear dodecylbenzene sulfonate. Petroleum sulfonates may also be used as the first anionic surfactant in this invention.

2. A second anionic surfactant having the following general formula:

[R'—(OCH$_2$CH$_2$)$_n$—SO$_4$]$^-$ Y$^+$ (polyethoxylated sulfate)

wherein R' is an alkyl or alkylaryl radical, linear or branched, having from 7 to 20 carbon atoms, n is an integer from 1 to 10 and Y is a monovalent cation such as sodium, potassium or ammonium.

3. A nonionic surfactant having one of the following structures:

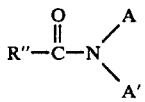   (a)

wherein R' is an alkyl radical, linear or branched, having from 5 to 20 and preferably 8 to 14 carbon atoms, A and A' are independently selected from the group consisting of hydrogen and alkanols having from 1 to 10 carbon atoms. For example, dodecyldiethanolamide, lauryldiisopropanolamide, laurylmonoethanolamide, or laurylmonoisopropanolamide are preferred materials for use in this surfactant system.

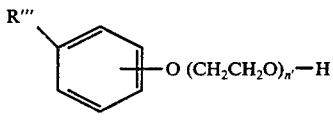   (b)

(polyethoxylated alkylphenol)

wherein R' is an alkyl radical having from 5 to 20 and preferably 8 to 14 carbon atoms, and $n'$ is an integer from 6 to 20.

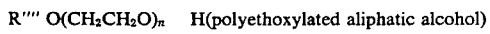   (c)

R''''O(CH$_2$CH$_2$O)$_n$ H(polyethoxylated aliphatic alcohol)

wherein R'''' is an alkyl chain having from 5 to 20 and preferably from 8 to 14 carbon atoms and $n''$ is an integer from 6 to 20.

The subterranean petroleum containing formation where this invention will be applied will ordinarily be a limestone formation, although any formation having water containing from about 1500 to about 12,000 parts per million calcium and/or magnesium ions can effectively be exploited by means of the subject process. Ordinarily, secondary recovery by water injection or some other secondary recovery process will have been applied to the reservoir before the application of the micellar slug of this invention although this is not a requirement for the employment of this invention. However, water injection or water flooding may be a desirable first secondary recovery process since it is less expensive than the micellar flooding program of this invention and thus the amount of expensive micellar flooding medium needed to produce additional oil might be reduced significantly.

In order to keep the micellar slug of the invention from fingering into a highly viscous petroleum in a subterranean formation it may be necessary to increase the viscosity of the micellar slug with another material such as a polymer. Hydrophilic polymer such as polyacrylamides and polysacchrides are effective for this purpose and are generally used to increase the viscosities of fluids. They may be used in concentrations from about 100 to about 5,000 parts per million. When the viscosity of the driving fluids, in this case the micellar slug, approaches or is greater than the viscosity of the petroleum in the reservoir, the mobility ratio is sufficient that improved sweep efficiency can be achieved and fingering of the micellar solution will be decreased or eliminated.

In a typical embodiment of our invention a driving fluid is used to push the novel micellar composition of our invention through the formation. This driving fluid may be liquid or gaseous including aqueous fluids. In forcing the micellar composition through the formation the problem of mobility control between the driving fluid and the micellar composition can be an important factor due to the possible difference in viscosity between the two fluids. To avoid the possibility of fingering or bypassing of the driving fluid into the micellar composition of the invention, a thickened driving fluid may be used to increase the viscosity of the driving fluid. Many conventional methods of thickening fluids may be used including polymer addition.

Although the invention does not lie in specific proportions or concentrations the following is offered to aid those skilled in the art in formulating and using the micellar dispersions of the invention.

The relative amounts of each type of surfactant in the dispersions may be equal or different. However, it is generally acceptable to use each type of surfactant in an amount ranging from about 0.05 to 5.0 weight percent in an aqueous fluid and preferably from about 0.1 to 0.5 weight percent. To form the micellar dispersion of the invention it is generally acceptable to use from about 99 to 10 weight percent of the above surfactant-aqueous solution and about 1.0 to 90 weight percent of a suitable hydrocarbon. Preferably the surfactant-aqueous solution is present from about 95 to 65 weight percent and the hydrocarbon is present from about 5 to 35 weight percent in the micellar dispersion.

When using the micellar dispersion of the invention to displace hydrocarbons in a petroleum containing reservoir it is recommended that an amount ranging from about 1 to 50 percent of reservoir pore volume be used and preferably from about 5 to 30 percent of reservoir pore volume.

EXPERIMENTAL

In order to establish the operability of this invention, and further to determine the optimum ratio of the essential constituents of the novel surfactant composition of our invention, the following experimental work was performed.

Simulated formation water was prepared to match as closely as possible the analysis of formation water obtained from the Cogdell Unit, Scurry County, Texas, which was under laboratory evaluation for possible application of the subject invention. The composition of the simulated formation water is given in Table II below.

TABLE II
SIMULATED LIMESTONE FORMATION CONNATE WATER COMPOSITION

| | | |
|---|---|---|
| $CaSO_4$ | 0.97 | Grams Per Liter |
| $CaCl_2$ | 17.6 | Grams Per Liter |
| $MgCl_2 \cdot 6H_2O$ | 7.2 | Grams Per Liter |
| $NaHCO_3$ | 0.33 | Grams Per Liter |
| NaCl | 94.0 | Grams Per Liter |
| $Na_2SO_4$ | .985 | Grams Per Liter |

The simulated formation water contained approximately 6,500 parts per million calcium and 850 parts per million magnesium ions. This synthetic formation water was used in the capillary displacement tests described immediately below.

Capillary displacement tests provide a convenient and accurate method for confirming the suitability of the novel three component surfactant system of this invention. The tests are performed by filling a number of closed end capillary tubes with the particular crude oil being studied, and submerging the capillary tubes horizontally into the desired aqueous phase. In the instance of the subject series of tests, the aqueous phase comprised the indicated synthetic formation water plus the surfactant mixture being evaluated. In each instance of displacement of oil by the aqueous phase, a meniscus was formed at the oil water interface. The only force tending to displace oil from the capillary tube was the force resulting from the difference in specific gravities of the two fluids. This force was offset by the interfacial tension between the oil and aqueous fluid, and it was observed that essentially no displacement occurred in the instance of formation water having no surfactant added thereto. When the surfactant composition was successful in producing a movement in the meniscus, the distance traveled by the meniscus in millimeters in a 5 minute exposure interval in the chemical system is recorded, and it is this displacement in millimeters that is given in Table III below, which will be described more fully hereinafter. There was essentially no diplacement of the meniscus in the instance of capillary tubes submerged in the formation water containing no surfactant of any kind, indicating that the interfacial tension between the crude oil and the formation water was too great to permit displacement of the oil from the capillary. the maximum reduction in interfacial tension is indicated by the maximum value of the displacement observed in the capillary tubes.

TABLE III
CAPILLARY DISPLACEMENT TESTS - COGDELL UNIT CRUDE OIL (7,400 ppm water hardness)

| | Concentration, weight percent | Material | Capillary Displacement, mm |
|---|---|---|---|
| 1. | 0.2% | linear alkylaryl sulfonate | no displacement |
| 2. | 0.4% | linear alkylaryl sulfonate | no displacement |
| 3. | 0.8% | linear alkylaryl sulfonate | no displacement |
| 4. | 0.2% | alkyl polyethoxylated sulfate | no displacement |
| 5. | 0.4% | alkyl polyethoxylated sulfate | no displacement |
| 6. | 0.8% | alkyl polyethoxylated sulfate | no displacement |
| 7. | 0.2% | polyethoxylated alkylphenol | no displacement |
| 8. | 0.4% | polyethoxylated alkylphenol | no displacement |
| 9. | 0.8% | polyethoxylated alkylphenol | no displacement |
| 10. | 0.4% +0.2% | linear alkylaryl sulfonate polyethoxylated alkylphenol | 1.0 |
| 11. | 0.4% +0.4% | linear alkylaryl sulfonate polyethoxylated alkylphenol | 2.0 |
| 12. | 0.4% +0.2% | linear alkylaryl sulfonate alkyl polyethoxylated sulfate | 1.2 |
| 13. | 0.4% +0.4% | linear alkylaryl sulfonate alkyl polyethoxylated sulfate | 0 |
| 14. | 0.4% +0.4% | polyethoxylated alkylphenol alkyl polyethoxylated sulfate | 0 |
| 15. | 0.4% +0.2% +0.2% | linear alkylaryl sulfonate polyethoxylated alkylphenol alkyl polyethoxylated sulfate | 8.5 |
| 16. | 0.2% | fatty acid diethanolamide | 0 |
| 17. | 0.8% | fatty acid diethanolamide | 0 |
| 18. | 0.4% +0.2% +0.2% | linear alkylaryl sulfonate polyethoxylated alkyl sulfate fatty acid diethanolamide | 6.5 |

In the experimental tests described in Table III, the linear alkylaryl sulfonate was the ammonium salt of a laurylbenzene sulfonate, the alkyl polyethoxylated sulfate was a sodium salt of an approximately 5 mole ethylene oxide adduct of dodecyl sulfate, the polyethoxylated alkylphenol was a 9.5 mole ethylene oxide adduct of nonylphenol and the alkyl diethanolamide was dodecyl diethanolamide.

It can be seen from the data contained in Table III above, that no capillary displacement resulted from the use of 0.2, 0.4 or 0.8 percent by weight of any one of the individual materials when used alone in the 7,400 parts per million total hardness aqueous solution. Similarly, runs 10 and 11 show that the linear alkylaryl sulfonate and polyethoxylated alkylphenol are not effective in this formation water. Runs 12 and 13 showw that the linear alkylaryl sulfonate and alkyl polyethoxylated sulfate are not effective. Run 14 shows polyethoxylated alkylphenol and alkyl polyethoxylated sulfate do not function in this formation water. It can be seen in run 15, however, that the use of three materials, namely 0.4% by weight linear alkylaryl sulfonate plus 0.2 alkyl polyethoxylated phenol plus 0.2% by weight alkyl polyethoxylated sulfate results in a substantial capillary displacement. Similarly, runs 16 and 17 show neither 0.2% nor 0.8% of a fatty acid diethanolamide in the simulated formation water containing 7,400 ppm calcium plus magnesium produces capillary displacement. Run 18, however, illustrates that the simulated formation water to which has been added 0.4% linear alkylaryl sulfonate, 0.2% alkyl polyethoxylated sulfate and 0.2% fatty acid diethanolamide does produce a significant capillary displacement. Thus it is clear from the data that no interfacial tension reduction results from the use of any one of these materials alone, or from the use of a combination of any two of them, but interfacial tension reduction is achieved by the use of all three. The conclusion is inescapable that the three materials interact synergistically to produce a result not obtainable by the use of any one or two materials alone.

Another series of capillary displacement tests was performed using simulated formation water prepared to match as closely as possible the analysis of formation water obtained from the Slaughter Field, Hockley County, Texas which was also under laboratory evaluation for possible application of the subject invention. The composition of the simulated formation water is given in Table IV below.

TABLE IV

| SIMULATED LIMESTONE FORMATION CONNATE WATER COMPOSITION | |
|---|---|
| $CaSO_4$ | 0.97 Grams Per Liter |
| $CaCl_2$ | 40.65 Grams Per Liter |
| $MgCl_2 \cdot 6H_2O$ | 34.60 Grams Per Liter |
| $NaHCO_3$ | 0.40 Grams Per Liter |
| NaCl | 161.90 Grams Per Liter |

Some precipitation of salts occurred, however. The water was saturated with divalent cations of the various salts used in formulating the formation water, and contained approximately 15,000 parts per million calcium and 4,500 parts per million magnesium ions. This simulated connate water was used in varying dilutions in all of the capillary displacement tests described below.

In FIG. 1 there is illustrated the capillary displacements obtained in a series of tests using 30 percent of the simulated formation connate water whose composition is given in Table IV and varying concentrations of an aqueous solution containing the three component surfactant system of our invention. The diluted connate water contained approximately 6,000 parts per million total hardness and the aqueous surfactant solution contained approximately 15 percent by weight ammonium laurylbenzene sulfonate, 8.5 percent by weight ammonium lauryl polyethoxylated sulfate, and 8.5 percent lauric acid diethanolamide. As can be seen in FIG. 1, the capillary displacement increased with increasing amounts of surfactant solution to a maximum value between 3 and 5 volume percent, which corresponds to a concentration of from 0.45 to 0.75 percent by weight of the ammonium laurylbenzene sulfonate, and from 0.24 to about 0.40 percent by weight of the ammonium lauryl polyethoxylated sulfate and from 0.24 to 0.40 percent by weight of the lauric acid diethanolamide.

Figure 2:
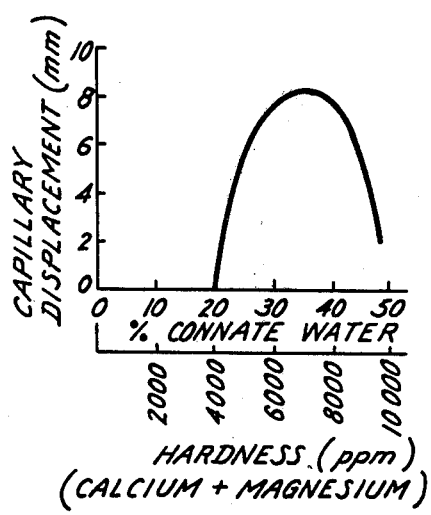
FIG. 2 illustrates capillary displacement tests using varying concentrations of polyvalent ions.

In FIG. 2, the results are given for a series of capillary displacement tests using 4 volume percent of the surfactant solution described above, with varying dilutions of the simulated connate water whose composition is given in Table IV. It can be seen that the maximum capillary displacement corresponds to about 30 percent to 40 percent connate water, or to about 6,000 to to 8,000 parts per million total hardness. Not only is this three component mixture effective in this range, but it is relatively ineffective substantially above or below this hardness range. the performance can be improved in solutions having more or less calcium plus magnesium by varying the ratios of compnents according to Table I.

Corresponding capillary displacement tests similar to those described above and in the same aqueous environment using only petroleum sulfonate for the surfactant could not be performed because of the immediate precipitation of petroleum sulfonate on contacting the aqueous solutions containing the high concentrations of calcium and magnesium that are involved in these tests.

Attached are figures showing the results of performing a tertiary flood utilizing an emulsified recovery agent (FIG. 3, Flood 3) vis-a-vis a simple surfactant flood (FIG. 4, Flood 5). The floods were both performed in the same pack which was a ¼ 5-spot having an injection well and a producing well (Properties are given in Table V). the pack in each case was initially saturated with simulated formation water (Tables VI and VII). The pack was then, in each case, flushed thoroughly with stock tank oil. The oil saturations resulting are shown in Table VIII and indicated as "at start of wterflood". Each flood involved injection of water as shown in the figures and yielded oil saturations shown in the figures and Table VIII.

Figure 3:
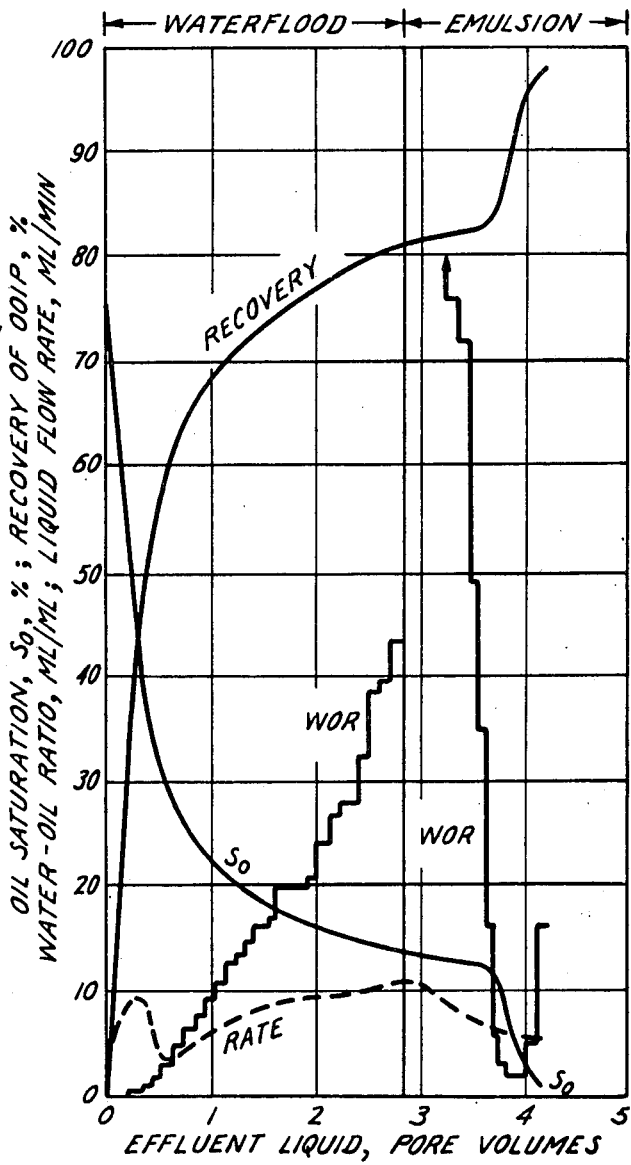

At the end of waterflooding, each flood was followed either with an emulsion recovery agent or surfactant recovery agent (Table VII). It is noted that the surfactant content on a volumetric basis was the same for both emulsion (Flood 3) and surfactant (Flood 5). It is further noted that the emulsion viscosity employed in Flood 3 was twice that of the surfactant used in Flood 5. The results indicated a markedly improved performance for the emulsion flood. The residual oil saturation after the emulsion flood was 1.3% (Table VIII) and 9.3% for the surfactant flood (Table VIII). In FIG. 3 it is shown that the emulsion flood was finished after approximately 1.5 pore volumes of emulsion had been injected. By contrast the surfactant in Flood 5 (FIG. 4) was injected in a quantity of about 2.8 pore volumes with significantly poorer results.

In both laboratory displacements shown herein, the tertiary recovery agent was injected in a continuous fashion after the waterflood. Ordinarily the tertiary recovery agent would be injected as a slug and followed by an ultimately less expensive drive fluid such as a polymer-thickened water, etc.

Comparison of the results of the two displacements shows the importance of controlling the mobility of the recovery agent. The improved (increased) viscosity of the emulsion provided better sweep of the pattern than did the lower viscosity surfactant solution in Flood 5.

TABLE V

| Properties of ¼ 5-spot Model | | |
|---|---|---|
| Areal Dimensions | 12" × 12" | |
| Thickness | ¼" | |
| Distance between injector and Producer | 17" | |
| Well Radii | 1" | |
| Matrix Material | 60–80 mesh crushed, sieved carbonate core | |
| Bulk Volume | 590 ml | |
| Properties Prior to Floor No. | 3 | 5 |
| Permeability, darcies | 3.12 | 3.22 |
| Pore Volume, ml (Measured by air displacement) | 236 | 234 |
| Porosity, % of bulk volume | 40.0 | 39.7 |

TABLE VI

| Simulated Formation Water | |
|---|---|
| Compound | g/l |
| $MgCl_2 \cdot 6H_2O$ | 7.20 |
| $Na_2SO_4$ | 0.98 |
| $CaCl_2$ | 17.60 |
| NaCl | 94.00 |
| Total dissolved solids | 115.97 |

TABLE VII

| Fluid Properties | | |
|---|---|---|
| | Density, g/ml | Viscosity, cp |
| Simulated Formation Water | 1.070 | 1.102 |
| Stock Tank Oil | 0.829 | 3.040 |
| Emulsion Recovery Agent* | 1.007 | 2.280 |
| Surfactant Recovery | | |

TABLE VII-continued

| | Fluid Properties | |
|---|---|---|
| Agent** | 1.065 | 1.220 |

| Compound | Vol % |
|---|---|
| 10% (Wt.) NH₄⁺ salt of dodecyl benzene sulfonic acid in distilled H₂O | 4.0 |
| 10% (Wt.) tridecyl polyethoxy sulfate in distilled water | 4.0 |
| Pentane | 15.0 |
| Simulated Cogdell Formation Water | 77.0 |
| Total | 100.0 |

| Compound | Vol % |
|---|---|
| 10% (Wt.) NH₄⁺ salt of dodecyl benzene sulfonic acid in distilled water | 4.0 |
| 10% (Wt.) tridecyl polyethoxy sulfate in distilled water | 4.0 |
| Simulated Cogdell Formation Water | 92.0 |
| Total | 100.0 |

*Used in Flood 3
**Used in Flood 5

TABLE VIII

| | Flood Results | |
|---|---|---|
| Flood No. | Oil Saturation | Recovery of OOIP, % |
| 3 | | |
| At Start of Waterflood | 71.5 | 0.0 |
| At End of Waterflood (WOR=43) | 13.4 | 81.3 |
| At End of Tertiary Emulsion Flood | 1.3 | 98.2 |
| 5 | | |
| At Start of Waterflood | 74.0 | 0.0 |
| At End of Waterflood (WOR=53) | 14.5 | 80.5 |
| At End of Tertiary Surfactant Flood | 9.3 | 87.2 |

Additional embodiments of our invention include using drive fluids to follow the emulsion of the invention consisting of a gas or gases such as flue gas, CO₂, methane, air and the like or combination thereof. The drive fluids could also contain liquid used in combination with the forementioned gases either injected sequentially or simultaneously, the liquid consisting of water, alcohol, polymer-thickened water and the like either used alone or together.

We also envision that the emulsion described previously could contain materials which alone would be gaseous at reservoir conditions of temperature and pressure. These gases could be used alone or together with the hydrocarbon liquids in the forementioned description. This would in effect allow the use of bubble point liquids, retrograde or dew point gases or completely gaseous materials and would not restrict the application of this invention to strictly hydrocarbon liquids. These gaseous components could contain methane, ethane, carbon dioxide, air, nitrogen, flue gas, hydrogen sulfide and the like. It is necessary that these gases used alone or in combination with liquids would form emulsions, microemulsions, or dispersions in the context of this invention.

We also note that in some applications of our invention that it would be desirable to employ a preflush ahead of the emulsion of the invention which will contain salts and other materials such as sacrificial agents to lessen adsorption of surfactant and/or polymer from the succeeding slugs on the rock surfaces. These materials might include sodium tripolyphosphate, salts of ethylenediamine tetracetic acid, sodium sulfate and the like.

It may also be desirable to include thickening agents such as polymeric materials in the preflush. These thickening agents would aid in obtaining better volumetric sweep or contact of the reservoir by the succeeding emulsion slug. It is also envisoned that it may be desirable to include materials such as the sacrificial agents or thickening agents into the emulsion slug itself for the same purposes.

Variations of this process should be apparent to those skilled in the art of oil recovery in view of this disclosure. Therefore, the forementioned materials are not intended to be the only materials to be employed and it is intended that details described to explain the invention can be altered by persons skilled in the art within the scope of the appended claims.

We claim:

1. A process for recovering petroleum from a subterranean reservoir wherein a first fluid is driven through the reservoir from an injection well to a production well by a second fluid where petroleum is produced the first fluid comprising a hydrocarbon, an aqueous fluid containing from about 1500 to 12,000 parts per million ions of calcium and/or magnesium and a surfactant system wherein the surfactant system comprises a first anionic surfactant having one of the following general formulas:

$$R-SO_3^- - Y^+$$

wherein R is an alkyl radical, linear or branched, having from 5 to 25 carbon atoms, and Y is a monovalent cation such as sodium, potassium or ammonium; or

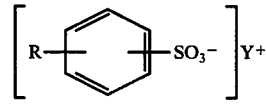

wherein R and Y have the same meaning as above and a second anionic surfactant having the following general formula:

$$[R'-(OCH_2CH_2)_n-SO_4]^- Y^+$$

wherein R' is an alkyl or alkylaryl radical, linear or branched, having from 7 to 20 carbon atoms, n is an integer from 1 to 10 and Y is a monovalent cation such as sodium, potassium or ammonium and a nonionic surfactant having one of the following structures:

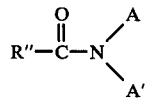

wherein R" is an alkyl radical, linear or branched, having from 5 to 20 carbon atoms, A and A' are independently selected from the group consisting of hydrogen and alkanols having from 1 to 10 carbon atoms; or

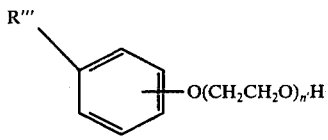

wherein R''' is an alkyl radical having from 5 to 20 carbon atoms, and $n'$ is an integer from 6 to 20 or

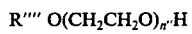

wherein R'''' is an alkyl chain having from 5 to 20 carbon atoms and $n''$ is an integer from 6 to 20.

2. A process as in claim 1 wherein the first anionic surfactant is ammonium linear dodecyl benzene sulfonate.

3. A process as in claim 1 wherein the hydrocarbons contain from 1 to 6 carbon atoms.

4. A process as in claim 3 wherein the hydrocarbons are liquefied petroleum gases.

5. A process as in claim 4 wherein the first fluid is produced via the production well and the liquefied petroleum gases are recovered.

6. A process as in claim 1 wherein the hydrocarbon component comprises from about 1.0 to 90 weight percent of the total mixture, the aqueous fluid and surfactant mixture comprises from about 99 to 1 weight percent of the total mixture and each type of surfactant comprises from about 0.05 to 5.0 weight percent of the aqueous fluid-surfactant mixture.

7. A process as in claim 1 wherein the second fluid is an aqueous fluid.

8. A process as in claim 1 wherein the hydrocarbon component comprises crude oil.

* * * * *